(12) United States Patent
Bernett

(10) Patent No.: US 6,644,362 B2
(45) Date of Patent: Nov. 11, 2003

(54) DISC DRIVE GAS FILLING SYSTEM

(75) Inventor: Frank William Bernett, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/071,770

(22) Filed: Apr. 5, 2002

(65) Prior Publication Data

US 2003/0089417 A1 May 15, 2003

Related U.S. Application Data

(60) Provisional application No. 60/338,802, filed on Nov. 13, 2001.

(51) Int. Cl.⁷ .............................................. B65B 31/04
(52) U.S. Cl. ................................ 141/66; 141/8; 141/61; 141/95
(58) Field of Search ........................... 141/4, 8, 59, 61, 141/65, 66, 83, 94, 95; 360/97.02, 97.03, 97.04

(56) References Cited

U.S. PATENT DOCUMENTS

| | | | |
|---|---|---|---|
| 3,403,063 A | 9/1968 | Walker | |
| 4,268,878 A * | 5/1981 | Kearns | 360/97.02 |
| 4,367,503 A | 1/1983 | Treseder | 360/98 |
| 4,488,192 A | 12/1984 | Treseder | 360/98 |
| 4,556,969 A | 12/1985 | Treseder et al. | 369/291 |
| 5,114,913 A | 5/1992 | Coufal et al. | 505/1 |
| 5,335,126 A * | 8/1994 | Tokyuama et al. | 360/244.2 |
| 5,454,157 A | 10/1995 | Ananth et al. | 29/603 |
| 5,918,289 A | 6/1999 | Scheppers et al. | 73/863.21 |
| 6,119,534 A | 9/2000 | Dinsmore | 73/864.91 |
| 6,144,178 A * | 11/2000 | Hirano et al. | 318/476 |
| 6,182,715 B1 | 2/2001 | Ziegler et al. | 141/63 |
| 6,205,845 B1 | 3/2001 | Dinsmore et al. | 73/37 |
| 6,249,990 B1 | 6/2001 | Tannous et al. | 34/402 |

* cited by examiner

Primary Examiner—Gregory L. Huson
Assistant Examiner—Peter deVore
(74) Attorney, Agent, or Firm—Merchant & Gould P.C.

(57) ABSTRACT

A system for filling an enclosed environment of a disc drive with a gas other than air includes a filling system connection apparatus that can be connected to a corresponding disc drive connection apparatus that is connected to the enclosed environment of the disc drive. A vacuum source and a source of gas other than air can be connected to the filling system connection apparatus. The filling system also includes a pressure sensor can produce a pressure signal representative of the pressure within the enclosed environment of the disc drive. A control module receives the pressure signal and directs one of the vacuum source and the source of gas other than air through the filling system connection apparatus to the enclosed environment of the disc drive. A method of filling an enclosed environment of a disc drive with a gas other than air includes connecting the enclosed environment to a vacuum source. After the enclosed environment has reached a predetermined low pressure range of from about 5 torr to about 100 torr, it is disconnected from the vacuum source, such as by closing a valve. The enclosed environment is then connected to a source of gas other than air. After the enclosed environment has reached a predetermined high pressure, the vacuum source is disconnected from the enclosed environment.

21 Claims, 3 Drawing Sheets

DISC DRIVE GAS FILLING SYSTEM

RELATED APPLICATIONS

This application claims priority of U.S. provisional application Serial No. 60/338,802, filed Nov. 13, 2001.

FIELD OF THE INVENTION

This application relates generally to disc drives and more particularly to a system for filling a disc drive with a gas other than air.

BACKGROUND OF THE INVENTION

A disc drive typically includes a base to which various components of the disc drive are mounted. A top cover cooperates with the base to form a housing that defines an internal, sealed environment for the disc drive. Filling the sealed environment of disc drives with gases other than air can enhance their performance. For example, low-density inert gases such as helium can reduce the aerodynamic drag between the discs and their associated read/write heads by a factor of approximately five-to-one compared to operating in air. This reduced drag results in reduced power requirements for the spindle motor. A helium filled drive thus uses substantially less power than a comparable disc drive that operates in an air environment. At the same time, the helium gas conducts away heat generated during operation of the disc drive more effectively than air.

Despite the advantages of helium filled drives, such drives have not been commercially successful. This is mainly due to problems associated with the helium leaking from the disc drives over time. As the helium leaks out, air leaks in causing undesirable effects in the operation of the disc drives and possibly causing the disc drives to fail. For example, the increased concentration of air may increase the forces on the read/write head due to turbulent airflow within a drive and it may cause noise and/or the heads to fly at too great a distance above the discs. Thus, helium filled drives must be filled when they are first operated. Additionally, after helium has leaked from such drives they must be either discarded or refilled with helium. Filling disc drives with helium to a desired pressure and concentration can be time-consuming and difficult.

Accordingly there is a need for an improved system that can effectively fill a disc drive with a gas other than air, such as helium, to a desired concentration. The present invention provides a solution to this and other problems, and offers other advantages over the prior art.

SUMMARY OF THE INVENTION

Against this backdrop the present invention has been developed. One embodiment of the invention is a system for filling an enclosed environment of a disc drive with a gas other than air. The filling system includes a filling system connection apparatus that can be connected to a corresponding disc drive connection apparatus that is in turn connected to the enclosed environment of the disc drive. By way of example, the connection apparatus could be a Schrader-type valve. A vacuum source, such as a vacuum pump, and a source of gas other than air, such as a pressurized gas tank, can be connected to the filling system connection apparatus. The filling system also includes a pressure sensor that can produce a pressure signal representative of the pressure within the enclosed environment of the disc drive. A control module receives the pressure signal and directs one of the vacuum source and the source of gas other than air through the filling system connection apparatus to the enclosed environment of the disc drive.

Another embodiment of the present invention is a method of filling an enclosed environment of a disc drive with a gas other than air. The enclosed environment is connected to a vacuum source. After the enclosed environment has reached a predetermined low pressure range of from about 5 torr to about 100 torr, it is disconnected from the vacuum source, such as by closing a valve. The enclosed environment is then connected to a source of gas other than air, such as by opening a valve. After the enclosed environment has reached a predetermined high pressure, the vacuum source is disconnected from the enclosed environment, such as by closing the valve.

These and various other features as well as advantages which characterize the present invention will be apparent from a reading of the following detailed description and a review of the associated drawings.

DETAILED DESCRIPTION

Figure 1:
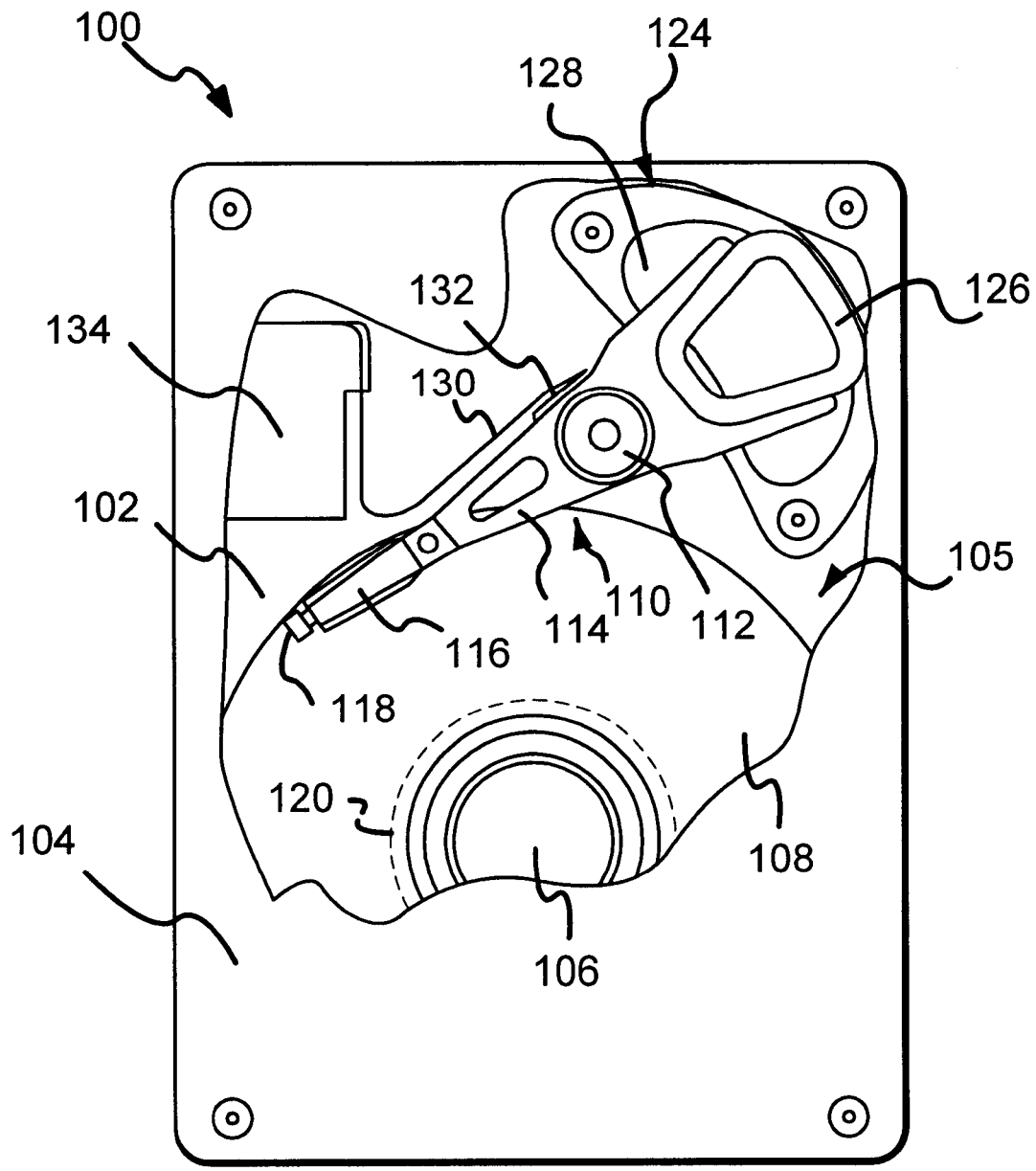
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a housing that defines an enclosed, sealed environment 105 for the disc drive in a conventional manner. The enclosed environment 105 of the disc drive 100 is filled with helium to enhance the performance of the disc drive 100.

The components of the disc drive 100 include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114, which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
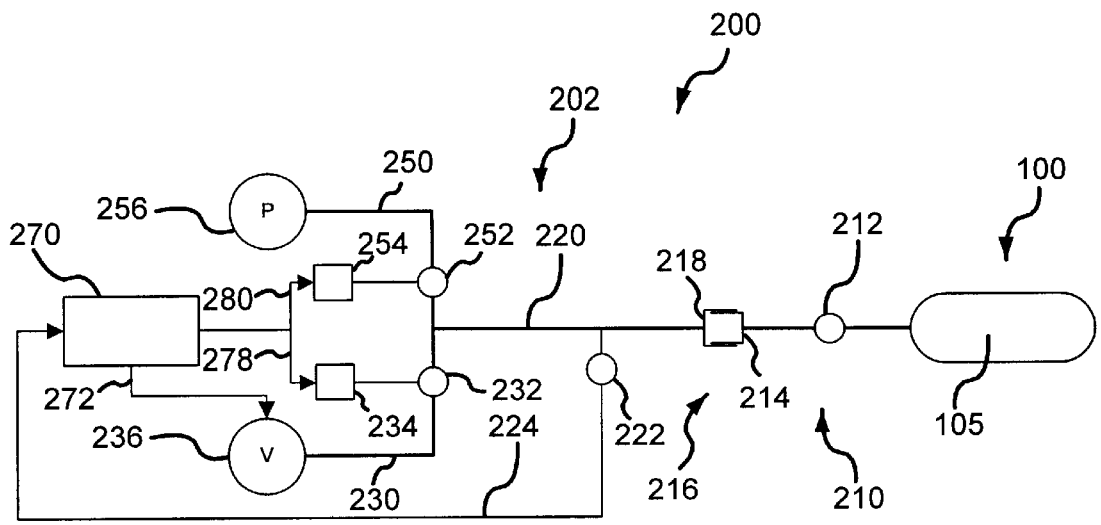
FIG. 2 is a schematic diagram of a disc drive gas filling system in accordance with a preferred embodiment of the present invention.

Referring now to FIG. 2, a system 200 in accordance with an embodiment of the present invention includes a filling system 202 and a disc drive 100. The filling system 202 fills the enclosed environment 105 of the disc drive 100 with a gas other than air, such as helium. The disc drive 100 includes a disc drive connection apparatus 210. The disc drive connection apparatus 210 preferably includes a normally closed valve 212 and a disc drive fitting 214. The valve 212 and the fitting 214 together are preferably part of a Schrader-type valve or other similar valve-fitting combination where the valve is normally closed until connected to a pressure/vacuum source fitting. Thus, the disc drive connection apparatus 210 is preferably a single Schrader-type valve fitting installed on the drive housing.

The filling system 202 preferably includes a filling system connection apparatus 216, which preferably includes a single filling system fitting 218, which mates with the disc drive fitting 214. When the filling system fitting 218 mates with the disc drive fitting 214, the filling system fitting 218 preferably opens the valve 212 of the disc drive connection apparatus 210. For example, where the disc drive connection apparatus 210 includes a Schrader-type valve, the filling system fitting 218 preferably includes a valve depressor that depresses the stem of the Schrader-type valve to open the valve 212.

A universal gas pressure and vacuum line 220 extends from the filling system connection apparatus 216 and splits into two lines. A pressure sensor 222 preferably senses the pressure within the universal line 220 and produces a pressure signal 224 that represents the pressure within the universal line 220. The pressure sensor 222 may be any of the many pressure sensors known to those skilled in the art that will sense pressures between 0 torr and at least about 1000 torr.

One line splitting from the universal line 220 is a vacuum line 230 that extends to a vacuum valve 232, which is actuated by a vacuum valve actuator 234. Preferably, the combination of the vacuum valve 232 and the vacuum valve actuator 234 together is a two-way solenoid valve combination that is normally closed and that can handle pressures from 0 torr to at least about 1000 torr. In an embodiment of the present invention, the solenoid valve combination may be a two-way normally closed S51 solenoid valve combination available from GC valves of Simi Valley, Calif., which is designed to handle pressures from 0 torr to about 13,000 torr (250 psi).

The vacuum line 230 extends from the vacuum valve 232 to a vacuum source 236. The vacuum source 236 is generally a vacuum pump that is capable of pulling a vacuum of less than about 100 torr. In a preferred embodiment, the vacuum pump is capable of creating a vacuum of less than about 5 torr. The vacuum pump is also preferably capable of being activated and deactivated remotely, such as by sending a pneumatic or electrical signal to the vacuum pump control circuitry.

The other line splitting from the universal line 220 is a gas pressure line 250, which preferably extends to a gas valve 252 that is actuated by a gas valve actuator 254. In a preferred embodiment, the gas valve 252 and the gas valve actuator 254 together are the same as the vacuum valve 232 and the vacuum valve actuator 234, described above. The gas line 250 is connected between the gas valve 252 and a gas source 256. The gas source 256 is preferably capable of supplying gas, such as helium, to the gas line 250 to a pressure of at least about 1000 torr. In a preferred embodiment, the gas source 256 is a pressurized tank containing helium.

A control module 270 preferably receives the pressure signal 224 from the sensor 222 and produces control signals to perform the method described below with reference to FIGS. 4–5. More specifically, the control module 270 produces a vacuum source signal 272 that activates and deactivates the vacuum source 236, a vacuum valve signal 278 that prompts the vacuum valve actuator 234 to open and close the vacuum valve 232, and a gas valve signal 280 that prompts the gas valve actuator 254 to open and close the gas valve 252. The control module 270 may incorporate a microprocessor and operate under software control to receive and produce many other signals in addition to those discussed. For example, the control module 270 may receive input signals from a user to prompt the control to begin performing the filling method described below. The control module may also output display signals that provide information regarding the status of the filling system 202 to a user display.

The universal line 220, the vacuum line 230, and the gas line 250 are all preferably standard gas-carrying fluid lines that are capable of withstanding repeated pressure from 0 torr to at least about 1000 torr. Such fluid lines may be flexible hoses or rigid lines, such as metal lines. Preferably, these lines are made of copper.

The pressure sensor 222, the gas valve 252 and the gas valve actuator 254 can all be part of a pressure regulator. Of course, in such an embodiment the pressure signal 224 can be an electrical signal or it can be a pneumatic or mechanical signal within the pressure regulator, and at least a portion of the control module 270 can reside within the pressure regulator. The pressure regulator can be specifically designed to keep the pressure of the universal line 220 within the predetermined pressure range or it can be manually or remotely adjustable.

Figure 3:
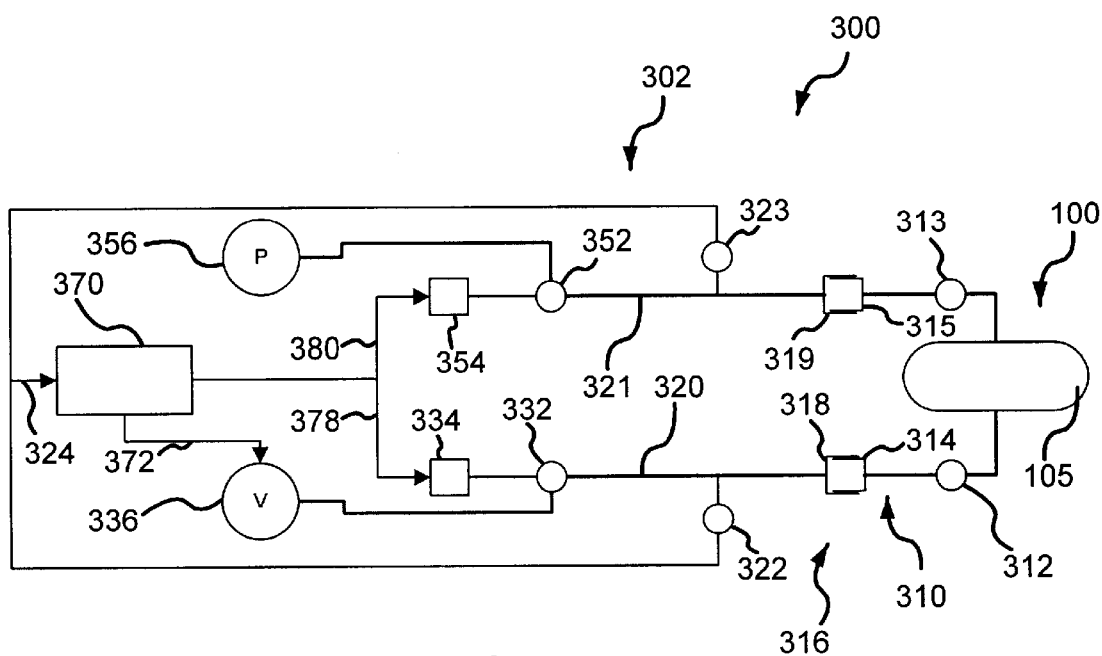
FIG. 3 is a schematic diagram of a disc drive gas filling system in accordance with an alternative embodiment of the present invention.

Referring now to FIG. 3, an alternative system 300 in accordance with an embodiment of the present invention includes a filling system 302 and the disc drive 100. The filling system 302 fills the enclosed environment 105 of the disc drive 100 with a gas other than air. The fluid lines, fittings, valves, sensors, actuators, sources, signal carriers, and the control module are all preferably similar to those described above with reference to the filling system 202. The filling system 302 differs from filling system 202 primarily in that it is adapted to have two entry ports into the disc drive 100, one for vacuum and one for gas.

The disc drive connection apparatus 310 includes a vacuum valve 312, a gas valve 313, a disc drive vacuum fitting 314, and a disc drive gas fitting 315. The combination of the vacuum valve 312 and the vacuum fitting 314 together is preferably similar to the valve-fitting combination 212, 214 described above. Likewise, the combination of the gas valve 313 and the gas fitting 315 together is preferably similar to the valve-fitting combination 212, 214 described above.

A filling system connection apparatus 316 includes a filling system vacuum fitting 318, which mates with the disc drive vacuum fitting 314 and opens the disc drive vacuum valve 312. The filling system connection apparatus 316 also includes a filling system gas fitting 319 that mates with the disc drive gas fitting 315 and opens the disc drive gas valve 313.

A vacuum line 320 extends from the filling system gas fitting 319 and a gas pressure line 321 extends from the filling system vacuum fitting 318. A vacuum pressure sensor 322 produces a signal that is representative of the pressure within the vacuum line 320, and a gas pressure sensor 323 produces a signal that is representative of the pressure within the vacuum line 320. The signal from the vacuum pressure sensor 322 and the gas pressure sensor 323 together form a pressure signal 324 that represents the pressure within the enclosed environment 105.

The vacuum line 320 extends to a vacuum valve 332 that is actuated by a vacuum valve actuator 334. The vacuum line 320 extends from the vacuum valve 332 to a vacuum source 336. The gas line 321 extends to a gas valve 352 that is actuated by a gas valve actuator 354. The gas line 321 then extends from the gas valve 352 to a gas source 356.

A control module 370 receives the pressure signal 324 from the pressure sensors 322, 323 and produces a vacuum source signal 372 that activates and deactivates the vacuum source 336, a vacuum valve signal 378 that prompts the vacuum valve actuator 334 to open and close the vacuum valve 332, and a gas valve signal 380 that prompts the gas valve actuator 354 to open and close the gas valve 352.

The pressure sensor 323, the gas valve 352 and the gas valve actuator 354 can all be part of a pressure regulator. Of course, in such an embodiment the pressure signal 324 can be an electrical signal or it can be a pneumatic or mechanical signal within the pressure regulator, and at least a portion of the control module 370 can reside within the pressure regulator. The pressure regulator can be specifically designed to keep the pressure of the gas line 321 within the predetermined pressure range or it can be manually or remotely adjustable.

Figure 4:
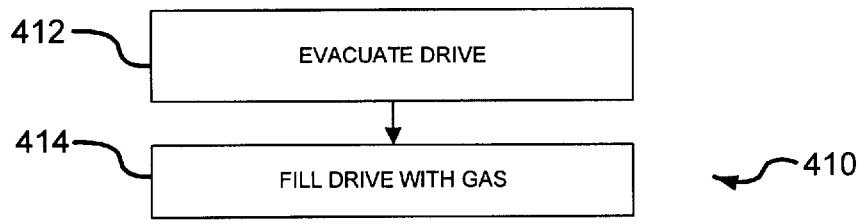
FIG. 4 is a flow chart of a general method of filling a disc drive with helium according to the present invention.

Referring now to FIG. 4, a general method 410 of filling a disc drive 100 will be described. In operation 412 the enclosed environment 105 of the disc drive 100 is evacuated, preferably to a predetermined low pressure. In operation 414, the evacuated enclosed environment 105 of the disc drive is filled with a gas other than air, such as helium, preferably to a predetermined high pressure. By first evacuating the gas other than air so that the enclosed environment 105 reaches a predetermined low pressure and then filling the disc drive with a gas other than air, such as helium, this method assures that the enclosed environment 105 of the disc drive 100 is filled to a desired concentration of helium. Preferably, the low pressure is from about 5 torr to about 100 torr. Low pressures below about 5 torr are difficult to attain with standard equipment, while low pressures above about 100 torr will not yield a sufficiently high concentration of helium. The high pressure is preferably slightly above ambient pressure to prevent leakage of air into the enclosed environment 105 of the disc drive. For example, the high pressure might be about 760 torr. For example, by evacuating a disc drive to a low pressure of about 76 torr and then filling with helium to a high pressure of about 760 torr, it is believed that the concentration of helium in the disc drive will be at least about 95%.

Filling systems 202, 302 could be included at the site of a user of helium filled disc drives. Thus, if the disc drive 100 reached an unacceptably low level of helium concentration, the user could simply refill the disc drive 100 with a filling system 202, 302. The disc drive 100 could then resume operation. Alternatively, such filling systems 202, 302 could be included at suppliers' facilities and drives with unacceptably low levels of helium could be brought to the suppliers' facility to refill the disc drive with helium. Of course, the filling systems 202, 302 could also be used in filling new disc drives with helium before use.

Figure 5:
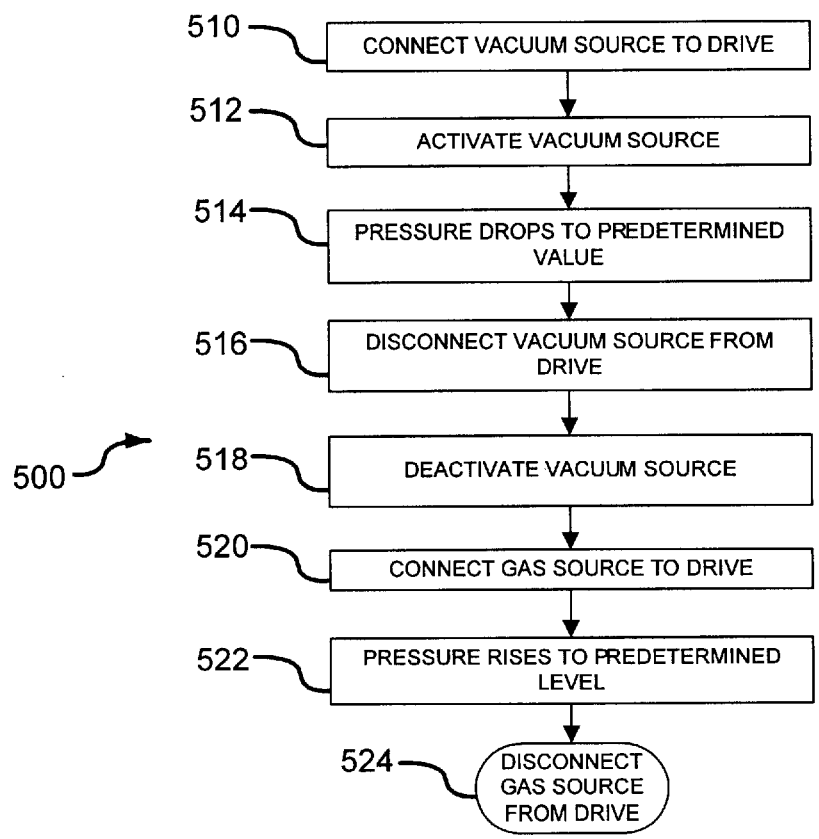
FIG. 5 is a flow chart of a preferred embodiment of the method of FIG. 4.

Referring now to FIG. 5, a more specific method 500 will be described with reference to how the filling systems 202 and 302 would perform the operations of the method. Thus, reference will be made to similar features of both FIGS. 2 and 3.

In operation 510, the vacuum source is connected to the disc drive 100. This is preferably done by connecting the disc drive connection apparatus 210, 310 to the filling system connection apparatus 216, 316. This may physically be done either automatically or manually. The control module 270, 370 preferably prompts the vacuum valve actuator 234, 334 to open the vacuum valve 232, 332. Thus, the vacuum source 236, 336 is connected to the enclosed environment 105 through the filling system connection apparatus 216, 316 and the disc drive connection apparatus 210, 310.

In operation 512 the vacuum source is activated. This is preferably done by the control module 270, 370, which sends a vacuum source signal 272, 372 to the vacuum source 236, 336. In operation 514, the pressure within the enclosed environment 105 then drops to the predetermined low pressure value. The pressure sensor 222, 322, which produces a pressure signal 224, 324 that is received by the control module 270, 370, senses the pressure drop in the enclosed environment 105.

In operation 516, after the pressure signal 224, 324 indicates that the pressure within the enclosed environment 105 has reached the low pressure, the control module 270, 370 produces a vacuum valve signal 278, 378 that prompts the vacuum valve actuator 234, 334 to close the corresponding vacuum valve 232, 332. Thus, the vacuum source 236, 336 is disconnected from the enclosed environment 105.

In operation 518, the vacuum source 336 is deactivated. This is preferably done by the control module 270, 370 producing a vacuum source signal 272, 372 that deactivates the vacuum source 236, 336.

In operation 520, the enclosed environment 105 within the disc drive 100 is connected to the helium source 256, 356. The control module 270, 370 preferably does this by producing a gas valve signal 280, 380 that prompts the gas valve actuator 254, 354 to open the gas valve 252, 352. Thus, the gas source 256, 356 is connected to the enclosed environment 105 through the filling system connection apparatus 216, 316 and the disc drive connection apparatus 210, 310.

In operation 522, with the high pressure helium source 256, 356 connected to the low pressure enclosed environment 105, helium will flow from the high pressure helium source 256, 356 and fill the enclosed environment 105 with helium. The pressure sensor 222, 322, which produces a pressure signal 224, 324 that is received by the control module 270, 370, senses the pressure increase in the enclosed environment 105.

In operation 524, after the pressure signal 224, 324 indicates that the pressure within the enclosed environment 105 has reached the high pressure, the control module 270, 370 produces a gas valve signal 280, 380 that prompts the gas valve actuator 254, 354 to close the corresponding gas valve 252, 352. At this time, the enclosed environment 105 is preferably filled to a predetermined concentration of helium. Preferably, the disc drive connection apparatus 210, 310 is also disconnected from the filling system connection apparatus 216, 316. Thus, the gas source 256, 356 is disconnected from the enclosed environment 105.

A user with little expertise can easily implement the method 500. The user merely needs to connect the disc drive 100 to the filling system 202, 302 using the filling system connection apparatus 216, 316 and the disc drive connection apparatus 210, 310. In a preferred embodiment, this will merely require the user to connect one or more Schrader-type valves. The user then preferably prompts the control module 270, 370 to begin the automated portion of the filling method, and disconnects the disc drive 100 from the filling system 202, 302 after the automated portion of the filling method is complete.

In summary, an embodiment of the present invention is a system (such as 202 or 302) for filling an enclosed disc drive environment (such as 105) with a gas other than air. The system includes a filling system connection apparatus (such as 216 or 316), which is sized to releasably connect to a corresponding disc drive connection apparatus (such as 210 or 310). The disc drive connection apparatus is in turn connected to the enclosed environment of the disc drive. The system further includes a vacuum source (such as 236 or 336) and a source of gas other than air (such as 256 or 356) that are each selectively connected to the filling system connection apparatus. A pressure sensor (such as 222, 322, or 323) is able to produce a pressure signal (such as 224 or 324) representative of a pressure within the enclosed environment of the disc drive. A control module (such as 270 or 370) receives the pressure signal (such as 224 or 324) and directs one of the vacuum source and the source of gas other than air through the filling system connection apparatus to the enclosed disc drive environment.

The control module may be able to disconnect the filling system connection apparatus from the vacuum source and connect it to the source of gas other than air when the pressure signal indicates that the pressure is within a predetermined low pressure range. The low pressure range is preferably from about 5 torr to about 40 torr. The control module may also be able to disconnect the filling system connection apparatus from the source of gas other than air when the pressure signal subsequently indicates that the pressure has reached a predetermined high pressure. That high pressure may be above ambient pressure. It is preferably above 760 torr.

The system can further include a first valve (such as 232 or 332) between the vacuum source and the filling system connection apparatus and a second valve (such as 252 or 352) between the source of gas other than air and the filling system connection apparatus. The control module may control both of those valves. Also, the gas other than air may be helium.

The disc drive connection apparatus may include a disc drive fitting (such as 214, 314, or 315) and a disc drive valve (such as 212, 312, or 313), and the filling system connection apparatus may include a filling system fitting (such as 218, 318, or 319) for mating with the disc drive fitting, such that the disc drive valve opens when the filling system fitting mates with the disc drive fitting.

The disc drive connection apparatus may include a vacuum disc drive fitting (such as 314), a vacuum disc drive valve (such as 312), a gas disc drive fitting (such as 315) and a gas disc drive valve (such as 313). The filling system connection apparatus may include a vacuum filling system fitting (such as 318) for mating with the vacuum disc drive fitting, such that the vacuum disc drive valve opens when the vacuum filling system fitting mates with the vacuum disc drive fitting. The vacuum disc drive fitting is connected to the vacuum source. The filling system connection apparatus may also include a gas filling system fitting (such as 319) for mating with the gas disc drive fitting, such that the gas disc drive valve opens when the gas filling system fitting mates with the gas disc drive fitting. The gas disc drive fitting is connected to the source of gas other than air.

Alternatively, an embodiment of the present invention may be summarized as a method (such as 410 or 500) of filling an enclosed environment (such as 105) of a disc drive (such as 100) with a gas other than air. The method includes connecting (such as 510) the enclosed environment to a vacuum source (such 236 or 336). After the enclosed environment has reached a predetermined low pressure range of from about 5 torr to about 40 torr, the method includes disconnecting (such as 516) the vacuum source from the enclosed environment. The method also includes connecting (such as 520) the enclosed environment to a source of gas other than air (such as 256 or 356) and disconnecting (such as 524) the source of gas other than air from the enclosed environment after the enclosed environment has reached a predetermined high pressure.

The disc drive may be connected to a filling system (such as 202 or 302) comprising the vacuum source and the source of gas other than air while connecting the enclosed environment, disconnecting the vacuum source from the enclosed environment, connecting the enclosed environment to a source of gas other than air in, and disconnecting the vacuum source from the enclosed environment. The method may further include disconnecting the disc drive from the filling system after disconnecting the vacuum source from the enclosed environment.

Connecting the enclosed environment to the vacuum source may include opening a first valve (such as 232 or 332) and disconnecting the vacuum source from the enclosed environment may include closing the first valve. Furthermore, connecting the enclosed environment to the source of gas other than air may include opening a second valve (such as 252 or 352), and disconnecting the vacuum source from the enclosed environment may include closing the second valve.

An embodiment of the present invention may also be summarized as a system. The system includes a disc drive (such as 100) defining an enclosed environment (such as 105). The system also includes means (such as 202 or 302) for evacuating the enclosed environment to a pressure within a predetermined low pressure range in the enclosed environment and subsequently filling the enclosed environment with the gas other than air to produce a predetermined high pressure in the enclosed environment. The means for evacuating and filling is responsive to a pressure signal (such as 224 or 324) that is representative of the pressure within the enclosed environment.

It will be clear that the present invention is well adapted to attain the ends and advantages mentioned as well as those inherent therein. While embodiments have been described for purposes of this disclosure, various changes and modifications may be made which are well within the scope of the present invention. For example, pressure sensors could be located at any of various alternative locations, such as between the gas source and the gas valve and between the vacuum source and the vacuum valve. Numerous other changes may be made which will readily suggest themselves to those skilled in the art and which are encompassed in the scope of the invention disclosed and as defined in the appended claims.

What is claimed is:

1. A filling system for filling an enclosed disc drive environment with a gas other than air, the filling system comprising:
   a disc drive connection apparatus connected to the enclosed environment of the disc drive;
   a filling system connection apparatus sized to releasably connect to the disc drive connection apparatus;
   a vacuum source selectively connected to the filling system connection apparatus;
   a source of gas other than air selectively connected to the filling system connection apparatus;
   a pressure sensor operable to produce a pressure signal representative of a pressure within the enclosed environment of the disc drive; and
   a control module receiving the pressure signal and directing one of the vacuum source and the source of gas other than air through the filling system connection apparatus to the enclosed disc drive environment.

2. The filling system of claim 1, wherein the control module is operable to disconnect the filling system connection apparatus from the vacuum source and connect the filling system connection apparatus to the source of gas other than air when the pressure signal indicates that the pressure is within a predetermined low pressure range.

3. The filling system of claim 2, wherein the low pressure range is from about 5 torr to about 40 torr.

4. The filling system of claim 2, wherein the control module is operable to disconnect the filling system connection apparatus from the source of gas other than air when the pressure signal subsequently indicates that the pressure has reached a predetermined high pressure.

5. The filling system of claim 4, wherein the high pressure is above ambient pressure.

6. The filling system of claim 4, wherein the high pressure is above 760 torr.

7. The filling system of claim 1, further comprising a first valve between the vacuum source and the filling system connection apparatus and a second valve between the source of gas other than air and the filling system connection apparatus.

8. The filling system of claim 7, wherein the first and second valves are controlled by the control module.

9. The filling system of claim 1, wherein the gas other than air is helium.

10. The filling system of claim 1, wherein:
    the disc drive connection apparatus comprises a disc drive fitting and a disc drive valve; and
    the filling system connection apparatus comprises a filling system fitting for mating with the disc drive fitting, such that the disc drive valve opens when the filling system fitting mates with the disc drive fitting.

11. The filling system of claim 1, wherein the disc drive connection apparatus comprises:
    a vacuum disc drive fitting;
    a vacuum disc drive valve;
    a gas disc drive fitting; and
    a gas disc drive valve.

12. The filling system of claim 11, wherein the filling system connection apparatus comprises:
    a vacuum filling system fitting for mating with the vacuum disc drive fitting, such that the vacuum disc drive valve opens when the vacuum filling system fitting mates with the vacuum disc drive fitting, the vacuum disc drive fitting being connected to the vacuum source; and
    a gas filling system fitting for mating with the gas disc drive fitting, such that the gas disc drive valve opens when the gas filling system fitting mates with the gas disc drive fitting, the gas disc drive fitting being connected to the source of gas other than air.

13. A method of filling an enclosed environment of a disc drive with a gas other than air, the method comprising:
    (a) connecting the enclosed environment to a vacuum source;
    (b) disconnecting the vacuum source from the enclosed environment after the enclosed environment has reached a predetermined low pressure range of from about 5 torr to about 40 torr;
    (c) connecting the enclosed environment to a source of gas other than air; and
    (d) disconnecting the source of gas other than air from the enclosed environment after the enclosed environment has reached a predetermined high pressure.

14. The method of claim 13, wherein connecting the enclosed environment in step (a) comprises connecting the enclosed environment to a filling system that is operable to selectively connect the vacuum source and the source of gas other than air to the enclosed environment.

15. The method of claim 14, further comprising:
    (e) disconnecting the disc drive from the filling system after disconnecting the vacuum source from the enclosed environment in step (d).

16. The method of claim 13, wherein the high pressure is above about 760 torr.

17. The method of claim 13, wherein:
    connecting the enclosed environment to the vacuum source in step (a) comprises opening a first valve;
    disconnecting the vacuum source from the enclosed environment in step (b) comprises closing the first valve;
    connecting the enclosed environment to the source of gas other than air in step (c) comprises opening a second valve; and
    disconnecting the vacuum source from the enclosed environment in step (d) comprises closing the second valve.

18. The method of claim 13, wherein the gas other than air is helium.

19. A system comprising:
    a disc drive defining an enclosed environment; and
    means for evacuating the enclosed environment to a pressure within a predetermined low pressure range and subsequently filling the enclosed environment with a gas other than air to produce a predetermined high pressure in the enclosed environment, the means being responsive to a pressure signal representative of the pressure within the enclosed environment.

20. The system of claim 19, wherein the low pressure range is from about 5 torr to about 100 torr.

21. The system of claim 19, wherein the means for evacuating and filling comprises:

a disc drive connection apparatus connected to the enclosed environment of the disc drive;

a filling system connection apparatus sized to releasably connect to the disc drive connection apparatus;

a vacuum source selectively connected to the filling system connection apparatus;

a source of gas other than air selectively connected to the filling system connection apparatus;

a pressure sensor operable to produce a pressure signal representative of a pressure within the enclosed environment of the disc drive; and a control module receiving the pressure signal and directing one of the vacuum source and the source of gas other than air through the filling system connection apparatus to the enclosed disc drive environment.

* * * * *